(12) United States Patent
Kim (10) Patent No.: US 12,234,964 B2
(45) Date of Patent: Feb. 25, 2025

(54) LIGHTING DEVICE AND METHOD FOR VEHICLE

(71) Applicant: HYUNDAI MOBIS CO., LTD., Seoul (KR)

(72) Inventor: Do Hyoung Kim, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/192,755

(22) Filed: Mar. 30, 2023

(65) Prior Publication Data
US 2024/0191858 A1 Jun. 13, 2024

(30) Foreign Application Priority Data
Dec. 12, 2022 (KR) .................. 10-2022-0172624

(51) Int. Cl.
*F21S 41/657* (2018.01)
*F21S 41/19* (2018.01)

(52) U.S. Cl.
CPC ........... *F21S 41/657* (2018.01); *F21S 41/192* (2018.01)

(58) Field of Classification Search
CPC .............................. F21S 41/657; F21S 41/192
See application file for complete search history.

(56) References Cited

U.S. PATENT DOCUMENTS

| | | | |
|---|---|---|---|
| 2,900,491 A | 8/1959 | Bela Barenyi | |
| 3,543,234 A * | 11/1970 | Kennelly | B60Q 1/2611 362/540 |
| 4,380,789 A * | 4/1983 | Craig | B60Q 1/05 362/420 |
| 4,860,175 A * | 8/1989 | Antrim | B60Q 1/05 362/386 |
| 4,940,281 A * | 7/1990 | Komatsu | B60Q 1/05 296/193.09 |
| 5,125,714 A | 6/1992 | Lecher | |
| 2006/0092648 A1* | 5/2006 | Albou | F21S 41/275 362/544 |
| 2012/0051070 A1 | 3/2012 | Bakacha et al. | |
| 2017/0129394 A1 | 5/2017 | Salter et al. | |
| 2019/0257492 A1* | 8/2019 | Motohashi | F21S 41/143 |

FOREIGN PATENT DOCUMENTS

| | | | |
|---|---|---|---|
| DE | 102019128342 A1 | 4/2021 | |
| DE | 102021100982 A1 | 7/2022 | |
| EP | 2907705 A1 | 8/2015 | |
| EP | 3343095 A1 * | 7/2018 | ........... B60Q 1/0076 |
| EP | 3385131 A1 | 10/2018 | |
| EP | 3396237 A1 * | 10/2018 | ............ F21S 41/663 |
| EP | 3117141 B1 | 5/2019 | |

(Continued)

OTHER PUBLICATIONS

Extended European Search Report issued on Sep. 15, 2023 in the corresponding European Patent Application No. 23166401.2.

(Continued)

*Primary Examiner* — Fatima N Farokhrooz
(74) *Attorney, Agent, or Firm* — NovoTechIP International PLLC (57) ABSTRACT

The lighting device includes a lens unit mounted on a vehicle body and a light source unit embedded in the lens unit and hidden in the lens unit or configured to radiate light to the lens unit.

15 Claims, 9 Drawing Sheets

(56) References Cited

FOREIGN PATENT DOCUMENTS

| | | | |
|---|---|---|---|
| FR | 3048486 A1 | | 9/2017 |
| GB | 2451125 A | | 1/2009 |
| JP | H0572593 U | * | 10/1993 |
| JP | 2008-535199 A | | 8/2008 |
| JP | 2018056039 A | * | 4/2018 |
| KR | 10-0311953 B1 | | 4/2002 |
| KR | 10-2009-0088631 A | | 8/2009 |
| KR | 2014-0088626 A | | 7/2014 |
| KR | 10-2018-0069439 A | | 6/2018 |
| KR | 2021-0033308 A | | 3/2021 |
| KR | 2021-0136567 A | | 11/2021 |
| KR | 10-2022-0157127 A | | 11/2022 |
| KR | 2022-0152832 A | | 11/2022 |

OTHER PUBLICATIONS

Office Action issued on Nov. 5, 2024 in the corresponding Korean Patent Application No. 10-2022-0172624.

\* cited by examiner

LIGHTING DEVICE AND METHOD FOR VEHICLE

CROSS-REFERENCE TO RELATED APPLICATIONS

This application claims priority from and the benefit of Korean Patent Application No. 10-2022-0172624, filed on Dec. 12, 2022, which is hereby incorporated by reference for all purposes as if set forth herein.

TECHNICAL FIELD

Exemplary embodiments of the present disclosure relate to a lighting device and method for a vehicle, and more particularly, to a lighting device and method for a vehicle, which secure a view and provide lighting for providing information through a light source that is hidden or radiates light to the outside if necessary.

BACKGROUND

In general, headlights designed in a vehicle are fixedly installed in order to illuminate the front of the vehicle. Upon night driving, the headlights are turned on and secure a driver's view. Recently, the headlights are turned on even in the daytime, and induce safe driving based on vehicle recognition.

However, conventionally, there are problems in that a light source that radiates light has been fixed in the state in which the light source can be recognized from the outside and separate lighting means must be added in order to implement a communication lighting signal, and welcome and goodbye motion lighting, in addition to lighting. Accordingly, there is a need to solve such problems.

The background of the present disclosure has been disclosed in Korean Patent No. 10-0311953 (registered on Oct. 4, 2001 and entitled "ASSISTANCE LAMP OF A CAR").

SUMMARY

Various embodiments are directed to a lighting device and method for a vehicle, which secure a view and provide lighting for providing information through a light source that is hidden or radiates light to the outside if necessary.

In an embodiment, a lighting device for a vehicle includes a lens unit mounted on a vehicle body and a light source unit embedded in the lens unit and hidden in the lens unit or configured to radiate light to the lens unit.

The lens unit includes a first lens unit exposed to the outside and configured to transmit the light that is radiated by the light source unit, and a second lens unit disposed inside the first lens unit and configured to cover the first lens unit so that the inside of the first lens unit is invisible to the naked eye.

The light source unit includes a light generation unit disposed up and down in a plural number and configured to generate light when power is applied thereto, a light connection unit combined with each of the light generation units, and a light rotation unit configured to rotate the light connection unit so that the light generation unit radiates the light to the lens unit.

The light source unit further includes a light cover unit mounted on the outside of each of the light generation units and configured to cover the first lens unit so that the inside of the first lens unit is invisible to the naked eye.

The lighting device for a vehicle further includes a detection unit mounted on the vehicle body and configured to detect a surrounding environment and a controller configured to operate the light source unit by receiving a detection signal from the detection unit.

The detection unit includes at least any one of a movement detection unit for detecting a movement of an object, a noise detection unit for detecting noise, and a door detection unit for detecting an operation of a door.

The lighting device for a vehicle further includes an output unit mounted on the vehicle body and configured to provide auditory information to the outside.

The lighting device for a vehicle further includes an input unit provided in the vehicle body and configured to select a turn-on mode of the light source unit.

In an embodiment, a lighting device for a vehicle includes a center body unit mounted on a vehicle body and disposed at a central part of the front of the vehicle body, a lens unit disposed on each of both sides of the center body unit, a light source unit embedded in the lens unit and hidden in the lens unit or configured to radiate light to the lens unit, and a grill lens unit disposed between the center body unit and the lens unit and configured to provide grill lighting by transmitting the light that is radiated by the light source unit.

The lens unit includes a first lens unit exposed to the outside and configured to transmit the light that is radiated by the light source unit, a second lens unit disposed inside the first lens unit and configured to cover the first lens unit so that the inside of the first lens unit is invisible to the naked eye, and a third lens unit extended backward from the first lens unit and configured to guide, to the grill lens unit, the light that is radiated by the light source unit by transmitting the light.

The light source unit includes a light generation unit disposed up and down in a plural number and configured to generate light when power is applied thereto, a light connection unit combined with each of the light generation units, and a light rotation unit configured to rotate the light connection unit so that the light generation unit radiates the light to the lens unit or the grill lens unit.

The light source unit further includes a light cover unit mounted on the outside of each of the light generation units and configured to cover the first lens unit so that the inside of the first lens unit is invisible to the naked eye.

The lighting device for a vehicle further includes a detection unit mounted on the vehicle body and configured to detect a surrounding environment and a controller configured to operate the light source unit by receiving a detection signal from the detection unit.

The lighting device for a vehicle further includes an output unit mounted on the vehicle body and configured to provide auditory information to the outside and an input unit provided in the vehicle body and configured to select a turn-on mode of the light source unit.

In an embodiment, a lighting method for a vehicle includes a detection step of detecting, by a detection unit, an environment around a vehicle body, and a light operation step of a light source unit being rotated and hidden in a lens unit or radiating light to the lens unit under a control of a controller that has received a detection signal from the detection unit.

In the detection step, at least any one of a movement detection unit for detecting a movement of an object, a noise detection unit for detecting noise, and a door detection unit for detecting an operation of a door operates.

The light operation step includes a door detection step of detecting, by the door detection unit, the lock or unlock of the door and a greeting lighting step of the light source unit being rotated and providing greeting lighting in response to a detection signal of the door detection unit.

The light operation step includes a pedestrian detection step of detecting, by any one or more of the movement detection unit and the noise detection unit, whether a pedestrian approaches, a walking lighting step of the light source unit being rotated and providing walking lighting in response to a pedestrian detection signal of any one or more of the movement detection unit and the noise detection unit, and a driving lighting step of the light source unit providing driving lighting according to day and night in response to a pedestrian non-detection signal of the movement detection unit and the noise detection unit.

The lighting method for a vehicle further includes an output step of providing, by an output unit, auditory information while operating in conjunction with the light source unit.

A turn-on mode of the light source unit and an output mode of the output unit are wirelessly updatable.

In the lighting device and method for a vehicle according to the present disclosure, the light source unit that is disposed within the lens unit may be hidden in the lens unit or may provide lighting by radiating light to the lens unit, and may provide a driver or a pedestrian with a light signal.

DETAILED DESCRIPTION

Hereinafter, a lighting device and method for a vehicle according to embodiments of the present disclosure will be described with reference to the accompanying drawings. In this process, the thicknesses of lines or the sizes of elements illustrated in the drawings may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

Figure 1:
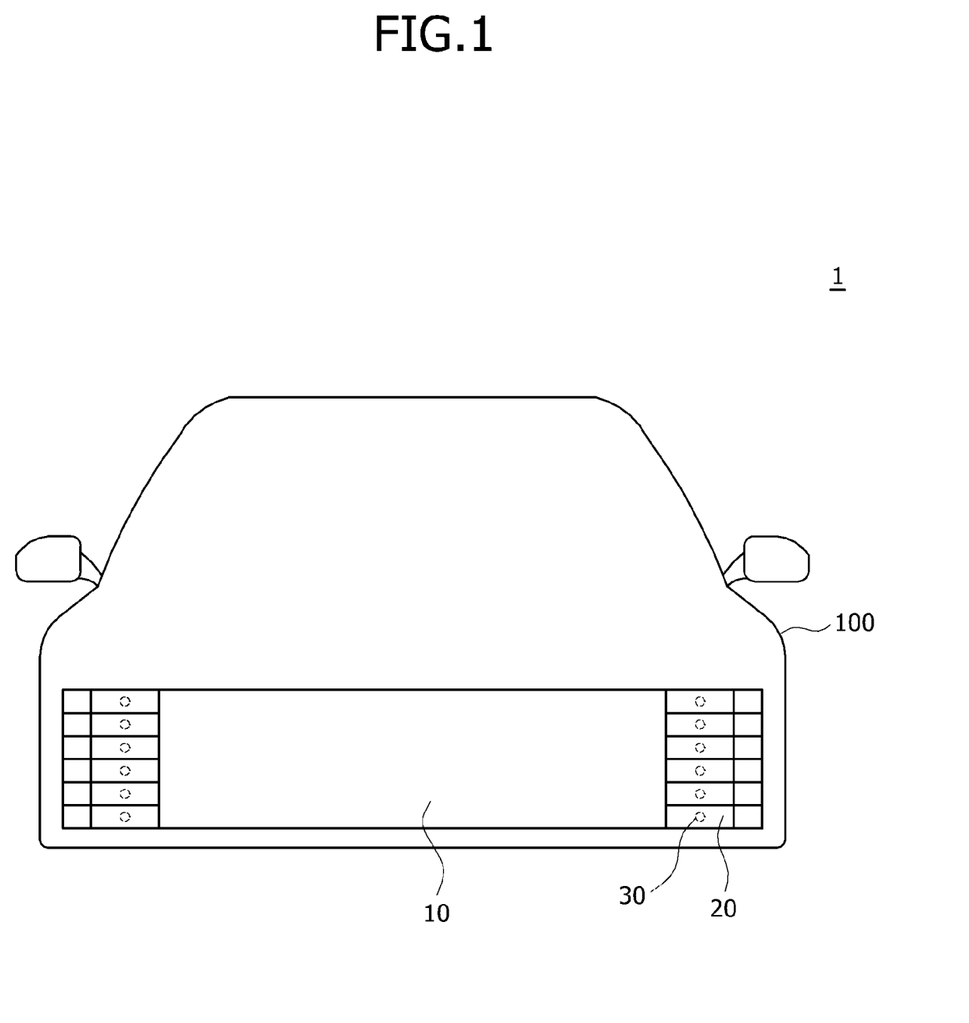
FIG. 1 is a diagram schematically illustrating a lighting device for a vehicle according to an embodiment of the present disclosure.

FIG. 1 is a diagram schematically illustrating a lighting device for a vehicle according to an embodiment of the present disclosure. Referring to FIG. 1, a lighting device 1 for a vehicle according to an embodiment of the present disclosure includes a lens unit 20 and a light source unit 30.

The lens unit 20 may be mounted on a vehicle body 100. For example, the lens unit 20 may be disposed at each of the left and right edges of the front of the vehicle body 100. When light is radiated through the lens unit 20, a driver's view can be secured, or information can be provided. In addition, the lens unit 20 may be disposed on any one or more of the side or rear of the vehicle body 100.

The light source unit 30 may be positioned within or embedded in the lens unit 20, and may be selectively hidden behind the lens unit 20 or may radiate light to the lens unit 20. For example, as light that is radiated by the light source unit 30 passes through the lens unit 20, driving lighting or information lighting may be provided. The driving lighting is lighting that induces securing a view upon night or day driving, and may be implemented by a low beam and a high beam. The information lighting may provide information to a driver before getting in a vehicle, a driver after getting out of a vehicle, a counterpart driver, or a pedestrian as the plurality of light source units 30 that are disposed vertically are turned on sequentially or alternately or are turned on simultaneously. The light source unit 30 may be used for communication in an autonomous driving mode, or may provide motion lighting for welcome or goodbye to a driver. The light source unit 30 being hidden in the lens unit 20 may mean that the light source unit 30 does not actually disappear from the lens unit 20, but the light source unit 30 is not visually exposed because a view for the inside of the lens unit 20 is not secured when the light source unit 30 is viewed from the outside.

A center body unit 10 that is mounted on the vehicle body 100 may be disposed at a central part of the front of the vehicle body 100. The center body unit 10 is fabricated by using a transparent or opaque material, and may transmit light if necessary. The lens unit 20 may be disposed on each of both sides of the center body unit 10. Furthermore, the light source unit 30 may be disposed in the length direction of the center body unit 10 in a plural number, and may be hidden in the center body unit 10 or may radiate light to the center body unit 10.

Figure 2:
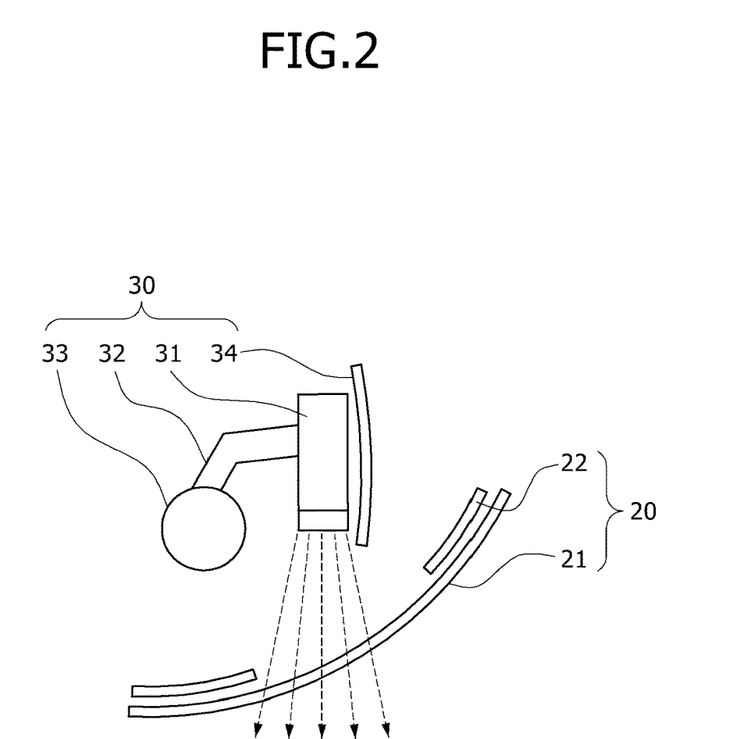
FIG. 2 is a diagram schematically illustrating the state in which a light source unit according to an embodiment of the present disclosure radiates light to the outside.
Figure 3:
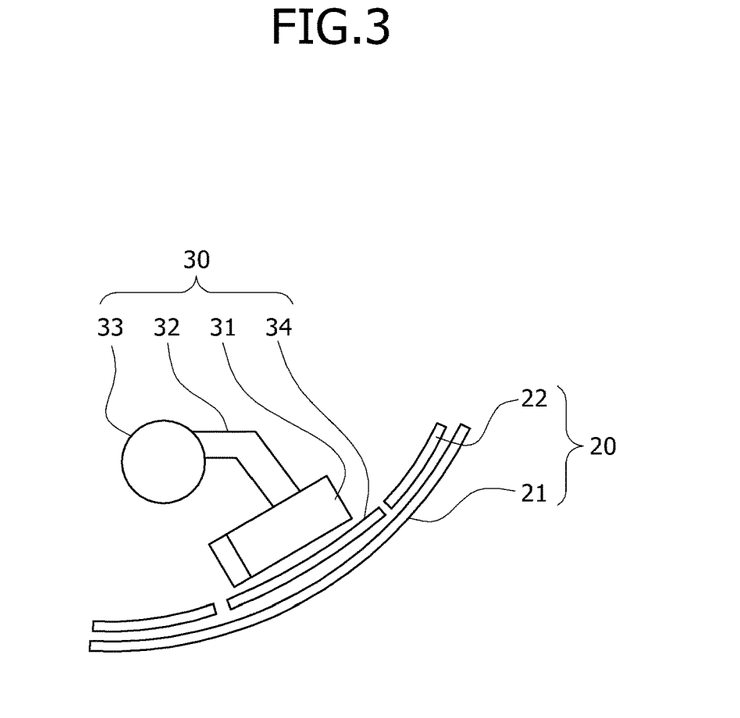
FIG. 3 is a diagram schematically illustrating the state in which the light source unit according to an embodiment of the present disclosure has been hidden in a lens unit.

FIG. 2 is a diagram schematically illustrating the state in which the light source unit according to an embodiment of the present disclosure radiates light to the outside. FIG. 3 is a diagram schematically illustrating the state in which the light source unit according to an embodiment of the present disclosure has been hidden in the lens unit.

The lens unit 20 according to an embodiment of the present disclosure may include a first lens unit 21 and a second lens unit 22.

The first lens unit 21 may be exposed exteriorly, and may transmit light that is radiated by the light source unit 30. For example, the first lens unit 21 may be mounted on the vehicle body 100, and may cover the light source unit 30. The first lens unit 21 may be molded by including a material capable of transmitting light.

The second lens unit 22 may be disposed inside the first lens unit 21, and may hide the first lens unit 21 so that the inside of the first lens unit 21 is invisible from outside or to the naked eye. For example, the second lens unit 22 includes an opaque material, and may be mounted or applied on the inside of the first lens unit 21. Parts of the second lens unit 22 may be isolated from each other. Light may pass through the first lens unit 21 that is disposed between the isolated spaces of the second lens unit 22.

The light source unit 30 according to an embodiment of the present disclosure may include a light generation unit 31, a light connection unit 32, and a light rotation unit 33.

The light generation unit 31 may generate light when power is applied thereto. The light generation unit 31 may be disposed up and down in a plural number. For example, a plurality of LED lamps may be disposed up and down in the light generation unit 31, and some of the plurality of LED lamps may be low beams and the remaining LED lamps may be high beams.

The light connection units 32 may be combined with the light generation units 31, respectively. For example, the light connection unit 32 may have one end connected to the light generation unit 31 and the other end connected to the light rotation unit 33. The light connection unit 32 may have a straight, curved, or bent shape depending on the design of an internal space of the lens unit 20.

The light rotation unit 33 may rotate each light connection unit 32 so that each light generation unit 31 radiates light to the lens unit 20. For example, the light rotation unit 33 may be rotatably mounted on the vehicle body 100. The light connection unit 32 may be combined with the outside of the light rotation unit 33. When the front of the light generation unit 31 is disposed to face the first lens unit 21 by the light rotation unit 33, lighting may be provided. Furthermore, when the side of the light generation unit 31 is disposed to face the first lens unit 21 by the light rotation unit 33, the light source unit 30 may have a state in which the light source unit 30 has been hidden in the lens unit 20.

The light source unit 30 according to an embodiment of the present disclosure may further include a light cover unit 34. The light cover unit 34 may be mounted on the outside of the light generation unit 31, and may cover the first lens unit 21 so that the inside of the first lens unit 21 is invisible to the naked eye. For example, the light connection unit 32 may be combined with one side of the light generation unit 31, and the light cover unit 34 may be mounted on the other side of the light generation unit 31. When the side of the light generation unit 31 is disposed to face the first lens unit 21 by the light rotation unit 33, the light cover unit 34 may be disposed between the isolated spaces of the second lens unit 22. Accordingly, the inside of the first lens unit 21 can be prevented from being recognized from the outside. The light cover unit 34 may be fabricated to have the same material and color as the second lens unit 22. The first lens unit 21 may be formed to have curvature. The light cover unit 34 may be formed to have curvature corresponding to that of the first lens unit 21. Furthermore, when the light cover unit 34 and the second lens unit 22 are consecutively disposed, the light source unit 30 may be recognized as being hidden in the lens unit 20 from the outside.

Figure 4:
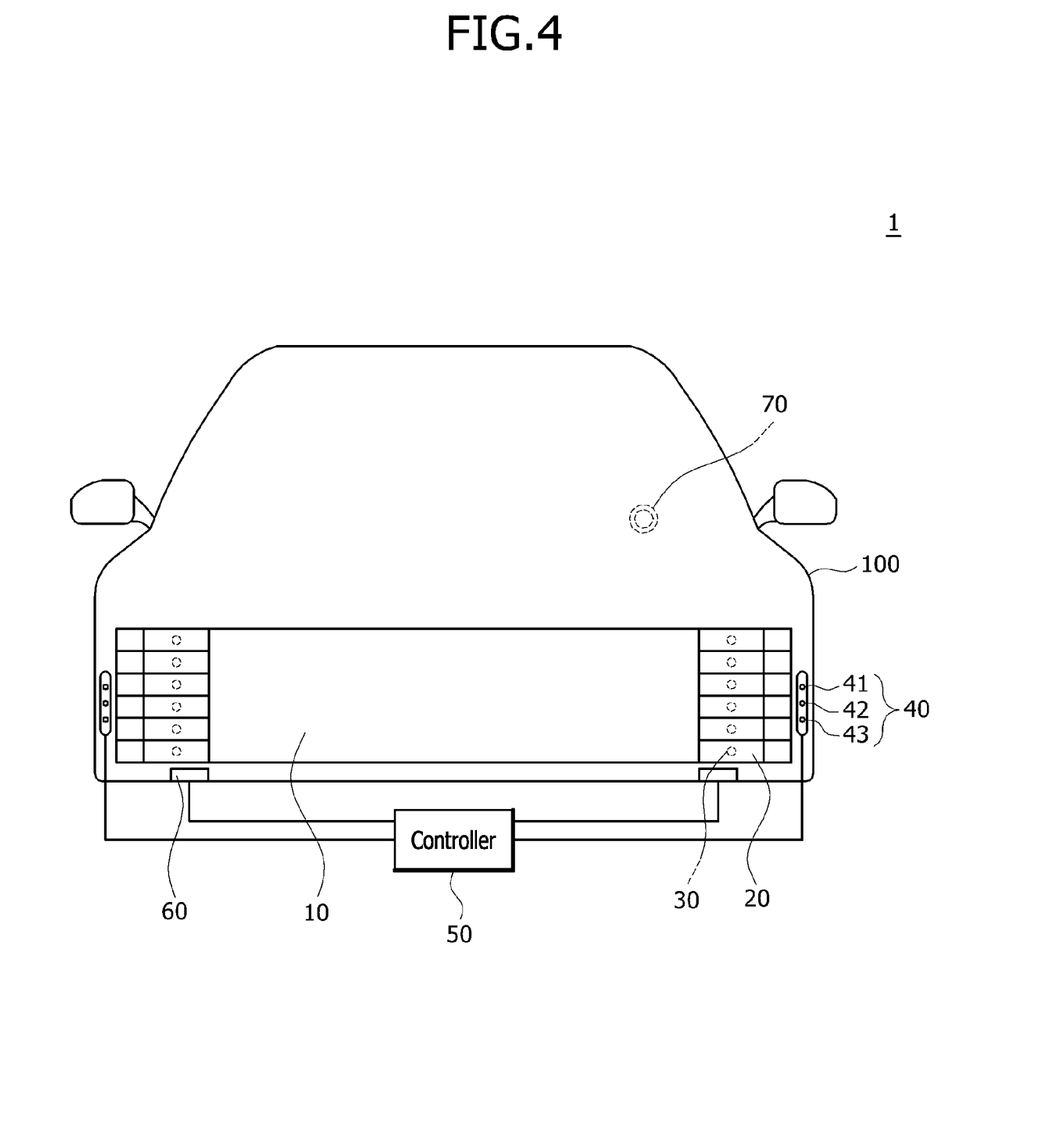
FIG. 4 is a diagram schematically illustrating a detection unit, an output unit, and an input unit according to an embodiment of the present disclosure.

FIG. 4 is a diagram schematically illustrating a detection unit, an output unit, and an input unit according to an embodiment of the present disclosure. Referring to FIG. 4, the lighting device 1 for a vehicle according to an embodiment of the present disclosure may further include a detection unit 40 and a controller 50.

The detection unit 40 may be mounted on the vehicle body 100, and may detect a surrounding environment. For example, the detection unit 40 may be disposed at an edge of the vehicle body 100, that is, at the outside of the lens unit 20. The detection unit 40 may detect a passing pedestrian or a sound.

The controller 50 may operate the light source unit 30 by receiving a detection signal from the detection unit 40. For example, the controller 50 may control the plurality of light source units 30 in response to the detection signal of the detection unit 40 so that the plurality of light source units 30 is individually turned on or simultaneously turned on.

More specifically, the detection unit 40 may include at least any one of a movement detection unit 41, a noise detection unit 42, and a door detection unit 43.

The movement detection unit 41 may detect a movement of an object. For example, the movement detection unit 41 may detect a movement of a driving vehicle or a pedestrian in an autonomous driving mode.

The noise detection unit 42 may detect surrounding noise. For example, the noise detection unit 42 may detect noise within a driving vehicle or noise that is caused by a pedestrian, which occurs around the vehicle body 100.

The door detection unit 43 may detect an operation of a door. For example, the door detection unit 43 may detect whether the state of a door is a lock state or an unlock state in response to a manipulation of a remote controller that is owned by a driver or a door switch that is provided in the vehicle body 100.

The lighting device 1 for a vehicle according to an embodiment of the present disclosure may further include an output unit 60. The output unit 60 according to an embodiment of the present disclosure may be mounted on the vehicle body 100, and may provide auditory information to the outside. For example, the output unit 60 may be disposed under the center body unit 10, and may be a speaker that provides a voice signal or an alarm signal. The output unit 60 may provide information to the outside while operating in conjunction with the light source unit 30. That is, the output unit 60 may output a voice signal or an alarm signal so that a pedestrian can safely pass by. The output unit 60 may be operated under the control of the controller 50 that has received a detection signal from the detection unit 40. The output unit 60 may output the voice signal in the form of a sentence in a selected language, and may output the alarm signal in the form of various waning sounds.

The lighting device 1 for a vehicle according to an embodiment of the present disclosure may further include an input unit 70. The input unit 70 according to an embodiment of the present disclosure is provided in the vehicle body 100, and selects a turn-on mode of the light source unit 30. Furthermore, the input unit 70 may select an output mode of the output unit 60. For example, the plurality of light source units 30 may be turned on simultaneously or individually in the turn-on mode. The output unit 60 may provide a voice signal or an alarm signal in the output mode.

The input unit 70 may be a signal bar for selecting the turn-on mode or output mode of a vehicle or a switch by which various types of driving information can be selected.

A driver may select the turn-on mode and the output mode according to his or her taste. The turn-on mode and the output mode may have turn-on methods or output methods that vary depending on a welcome or goodbye state, a walking state of a pedestrian, or a vehicle surrounding state. The turn-on mode and the output mode may be wirelessly updated.

An operation of the lighting device for a vehicle according to an embodiment of the present disclosure is described as follows.

The center body unit 10 is disposed at the central part of the vehicle body 100. The lens units 20 are disposed at the left and right edges of the vehicle body 100. The light source unit 30 is covered by the lens unit 20.

In this state, if driving lighting is required in response to a manipulation signal from a driver or based on a detected illuminance value, the front of the light generation unit 31 is disposed to face the first lens unit 21. Accordingly, light that is radiated by the light generation unit 31 passes through the first lens unit 21 and provides driving lighting.

In order to form communion with another vehicle or a pedestrian in response to a manipulation signal from a driver or upon autonomous driving or for communion with a driver, the light rotation unit 33 reciprocates and rotates a predetermined section. Accordingly, the front of the light generation unit 31 is disposed to face the first lens unit 21, or the side of the light generation unit 31 is disposed to face the first lens unit 21. If the side of the light generation unit 31 is disposed to face the first lens unit 21, the light cover unit 34 may be disposed at the rear of the first lens unit 21, and the light source unit 30 may have a state in which the light source unit 30 has been hidden in the lens unit 20.

In this case, when a surrounding environment, such as pedestrian information and driving vehicle information, is detected by the detection unit 40, the light source unit 30 may be driven under the control of the controller 50. The output unit 60 provides an auditory signal to the periphery of the vehicle body 100 in association with the light source unit 30.

Figure 5:
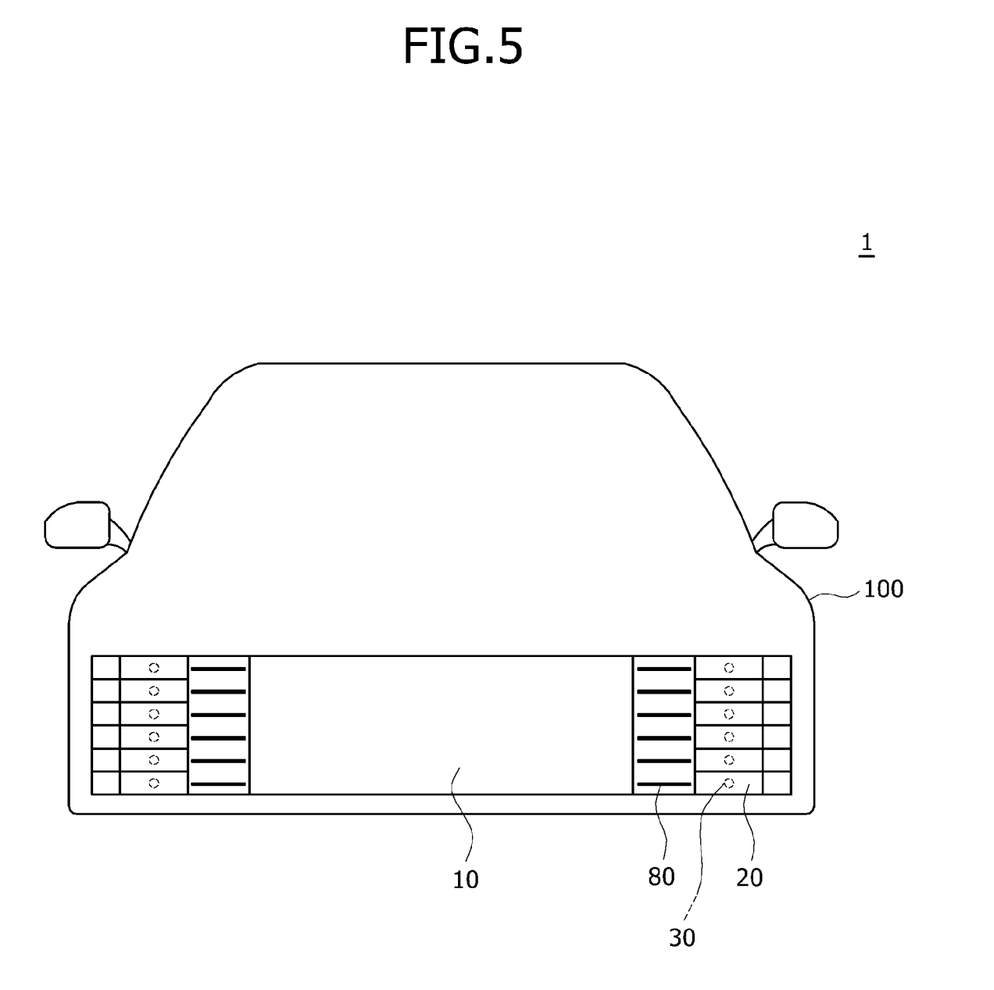
FIG. 5 is a diagram schematically illustrating the state in which the lighting device for a vehicle according to an embodiment of the present disclosure provides driving lighting and grill lighting.
Figure 6:
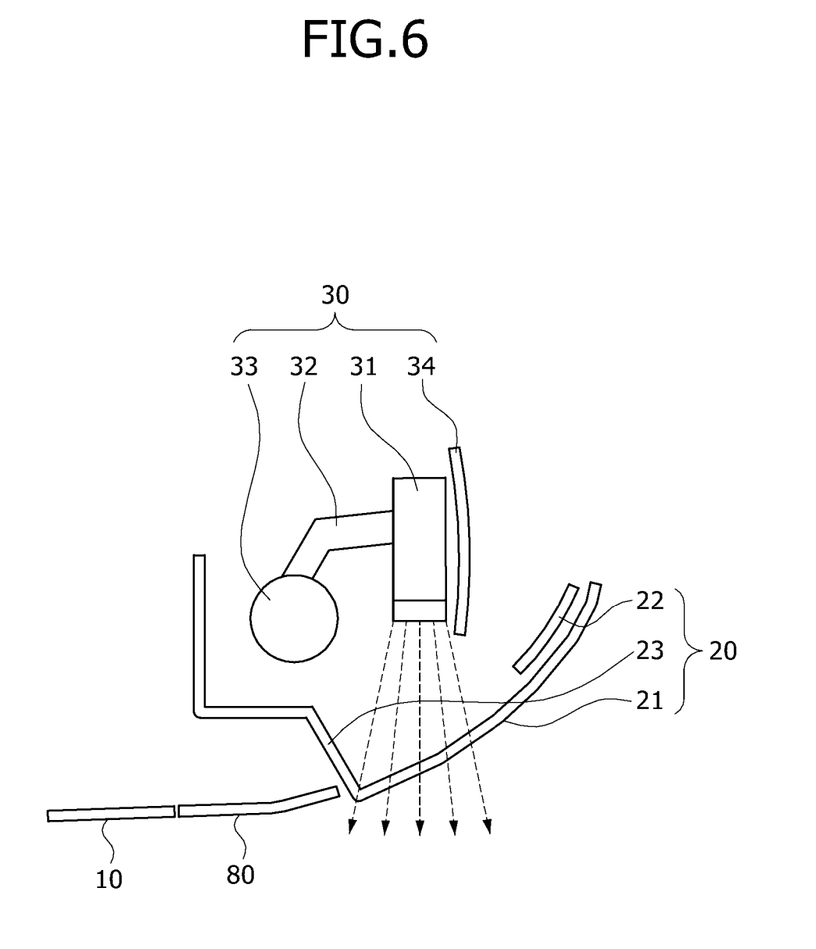
FIG. 6 is a diagram schematically illustrating the state in which driving lighting is performed in FIG. 5.
Figure 7:
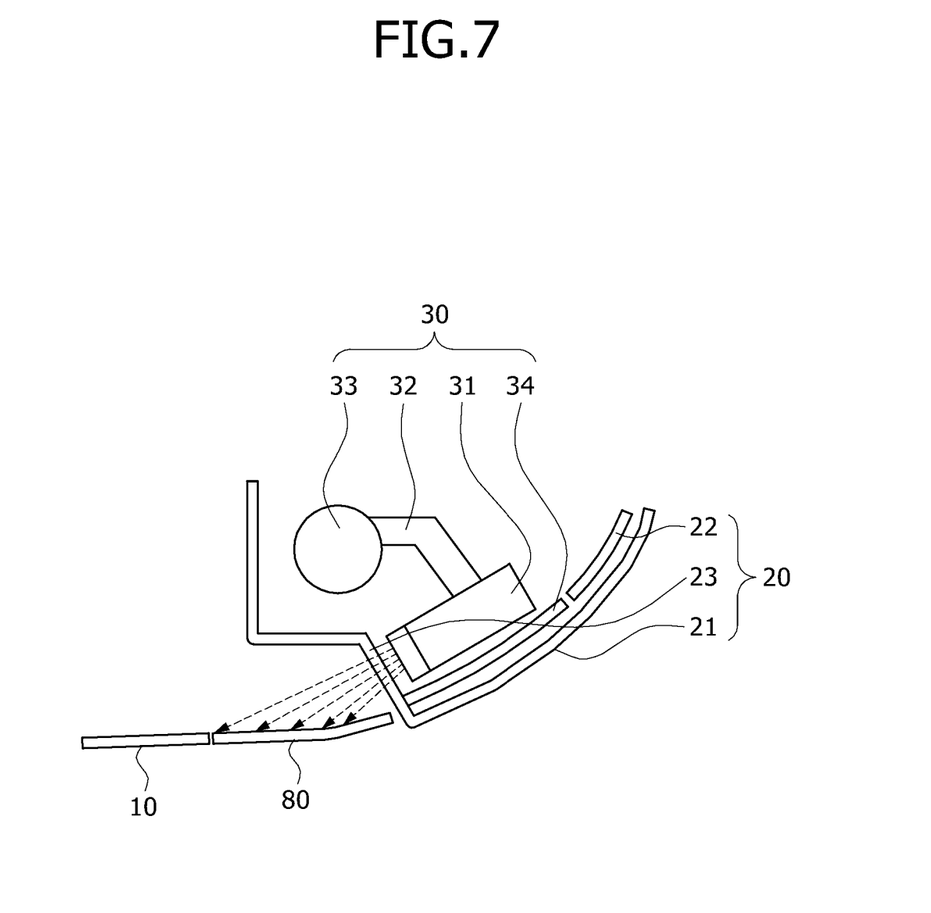
FIG. 7 is a diagram schematically illustrating the state in which grill lighting is performed in FIG. 5.

FIG. 5 is a diagram schematically illustrating the state in which the lighting device for a vehicle according to an embodiment of the present disclosure provides driving lighting and grill lighting. FIG. 6 is a diagram schematically illustrating the state in which driving lighting is performed in FIG. 5. FIG. 7 is a diagram schematically illustrating the state in which grill lighting is performed in FIG. 5. Referring to FIGS. 5 to 7, the lighting device 1 for a vehicle according to an embodiment of the present disclosure may further include a grill lens unit 80. The grill lens unit 80 is disposed between the center body unit 10 and the lens unit 20, and provides grill lighting by transmitting light that is radiated by the light source unit 30. For example, the grill lens unit 80 may be connected to at least any one of the vehicle body 100, the center body unit 10, and the lens unit 20. In this case, the grill lighting may be provided in the length direction of the vehicle body 100 on the left and right sides thereof. The grill lighting may be used for communication in the autonomous driving mode, or may provide a driver with motion lighting for welcome or goodbye.

The lens unit 20 may further include a third lens unit 23. The third lens unit 23 extends backward from the first lens unit 21 and surrounds the light source unit 30. The third lens unit 23 guides, to the grill lens unit 80, light that is radiated by the light source unit 30 by transmitting the light. For example, the third lens unit 23 may extend from one end of the first lens unit 21, and may partition a space in which the light source unit 30 is disposed. In addition, the third lens unit 23 may extend from both ends of the first lens unit 21 and cover the light source unit 30. A part of the third lens unit 23 may transmit light, and the remainder thereof may block light.

Accordingly, when driving lighting is required in response to a manipulation signal from a driver or based on a detected illuminance value, the front of the light generation unit 41 is disposed to face the first lens unit 21 and provides light. Furthermore, in response to a manipulation signal from a driver, in order to form communion with another vehicle or a pedestrian upon autonomous driving, or for communion with a driver, when the light rotation unit 33 is driven, the light generation unit 31 radiates light toward the grill lens unit 80 while being rotated. In this case, the light that is generated by the light generation unit 31 passes through the third lens unit 23, and provides grill lighting through the grill lens unit 80. At this time, when the light generation unit 31 reciprocates and rotates by the light rotation unit 33, an effect in which the grill lighting is moved left and right can be implemented.

Figure 8:
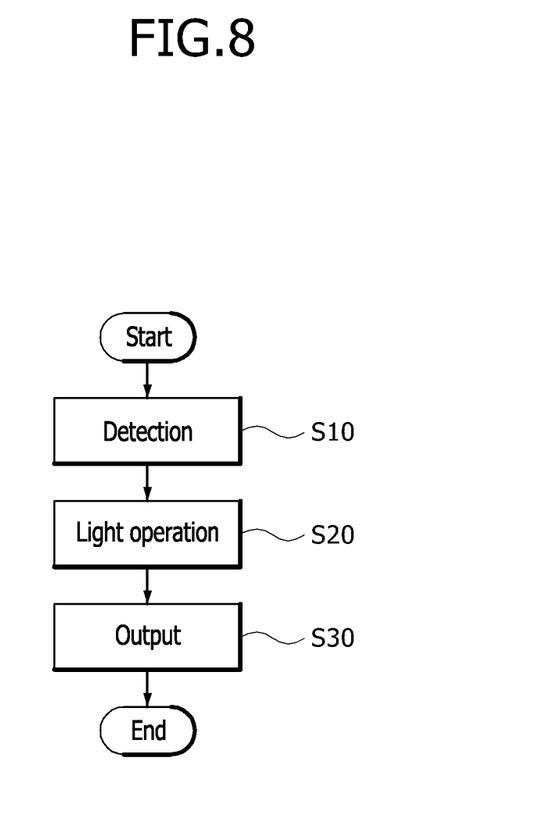
FIG. 8 is a flowchart schematically illustrating a lighting method for a vehicle according to an embodiment of the present disclosure.

FIG. 8 is a flowchart schematically illustrating a lighting method for a vehicle according to an embodiment of the present disclosure. Referring to FIG. 8, the lighting method for a vehicle according to an embodiment of the present disclosure includes a detection step S10 and a light operation step S20.

In the detection step S10, the detection unit 40 detects an environment around the vehicle body 100. The detection unit 40 may include at least any one of the movement detection unit 41, the noise detection unit 42, and the door detection unit 43. The movement detection unit 41 may detect a movement of an object. The noise detection unit 42 may detect surrounding noise. The door detection unit 43 may detect an operation of a door. In the detection step S10, at least any one of the movement detection unit 41, the noise detection unit 42, and the door detection unit 43 may detect a change in the surrounding environment.

In the light operation step S20, the light source unit 30 is rotated and hidden in the lens unit 20 or radiates light to the lens unit 20, under the control of the controller 50 that has received a detection signal from the detection unit 40. That is, in the light operation step S20, the plurality of light source units 30 that are disposed up and down may be individually operated or simultaneously operated.

The lighting method for a vehicle according to an embodiment of the present disclosure may further include an output step S30. In the output step S30, the output unit 60 provides auditory information while operating in conjunction with the light source unit 30. For example, under the control of the controller 50, the light source unit 30 may be rotated and provide light information, and the output unit 60 may provide a voice signal or an alarm signal.

The turn-on mode of the light source unit 30 or the output mode of the output unit 60 may have turn-on methods or output methods that vary depending on a welcome or goodbye state, a walking state of a pedestrian, or a vehicle surrounding state. The turn-on mode and the output mode may be wirelessly updated.

Figure 9:
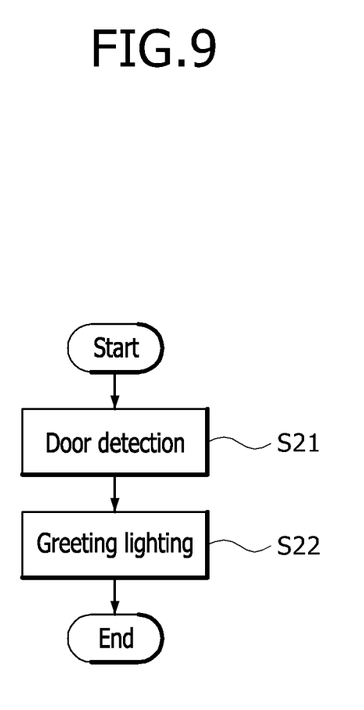
FIG. 9 is a diagram schematically illustrating a light operation method for greeting lighting according to an embodiment of the present disclosure.

FIG. 9 is a diagram schematically illustrating a light operation method for greeting lighting according to an embodiment of the present disclosure. Referring to FIG. 9, the light operation method for greeting lighting includes a door detection step S21 and a greeting lighting step S22.

In the door detection step S21, the door detection unit 43 detects the lock or unlock of a door. For example, the door detection unit 43 may detect whether the state of a door is the lock state or the unlock state, in response to a manipulation of a remote controller that is owned by a driver or a door switch that is provided in the vehicle body 100.

In the greeting lighting step S22, the light source unit 30 provides greeting lighting while being rotated, in response to a detection signal of the door detection unit 43. For example, in the case of a welcome signal, the plurality of light source units 30 may be sequentially or simultaneously turned on and may provide a light signal for welcome, and a winker may flicker. Furthermore, in the case of a goodbye signal, the plurality of light source units 30 may be sequentially or simultaneously turned on, and may provide a light signal for goodbye. In addition, the output unit 60 may output a voice signal or alarm signal corresponding to greeting lighting, along with a light signal.

Figure 10:
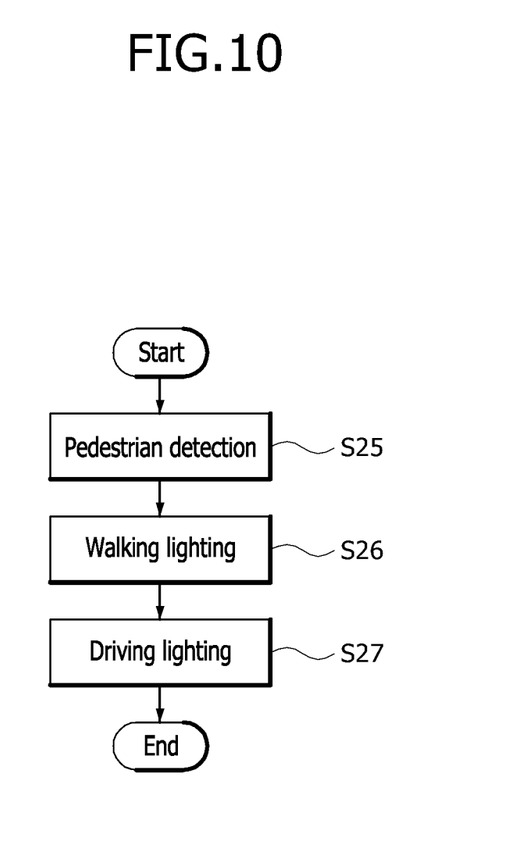
FIG. 10 is a diagram schematically illustrating a light operation method for walking lighting according to an embodiment of the present disclosure.

FIG. 10 is a diagram schematically illustrating a light operation method for walking lighting according to an embodiment of the present disclosure. Referring to FIG. 10, the light operation method for walking lighting includes a pedestrian detection step S25, a walking lighting step S26, and a driving lighting step S27.

In the pedestrian detection step S25, any one or more of the movement detection unit 41 and the noise detection unit 42 detects whether a pedestrian approaches. For example, the movement detection unit 41 may detect a movement of a surrounding object, and the noise detection unit 42 may detect surrounding noise. The movement detection unit 41 and the noise detection unit 42 may detect a pedestrian.

In the walking lighting step S26, the controller 50 may determine whether a pedestrian walks past the front of the vehicle which has been stopped, by receiving a pedestrian detection signal from any one or more of the movement detection unit 41 and the noise detection unit 42. Furthermore, the light source unit 30 provides walking lighting while being rotated, under the control of the controller 50 based on a walking state of the pedestrian. For example, the plurality of light source units 30 may be sequentially or simultaneously turned on, and may provide a light signal that induces the walking direction of the pedestrian or the walking safety of the pedestrian. In this case, the output unit 60 may output a voice signal or alarm signal corresponding to the walking lighting, along with the light signal.

In the driving lighting step S27, in the process of the walking lighting being performed, if the movement detection unit 41 and the noise detection unit 42 do not detect the pedestrian, the controller 50 determines that the pedestrian has passed by. At this time, the light source unit 30 may provide driving lighting according to day and night, under the control of the controller 50.

That is, in the case of daytime, after the pedestrian passes by, motion driving of the light source unit 30 may be stopped, and daytime driving lighting may be turned on. Furthermore, in the case of nighttime, after the pedestrian passes by, motion driving of the light source unit 30 may be stopped, and nighttime driving lighting may be turned on.

In the lighting device and method for a vehicle according to the present disclosure, the light source unit 30 that is disposed within the lens unit 20 may be hidden in the lens unit 20 or may provide lighting by radiating light to the lens unit 20, and may provide a light signal to a driver or a pedestrian.

Although exemplary embodiments of the disclosure have been disclosed for illustrative purposes, those skilled in the art will appreciate that various modifications, equivalent other embodiments are possible, without departing from the scope and spirit of the disclosure as defined in the accompanying claims. Thus, the true technical scope of the disclosure should be defined by the following claims.

What is claimed is:

1. A lighting device for a vehicle, comprising:
a lens unit mounted on a vehicle body; and
a light source unit positioned within the lens unit and selectively hidden behind or configured to radiate light to the lens unit,
wherein the lens unit comprises:
a first lens unit having an outer surface thereof exposed exteriorly on the vehicle body and an inner surface thereof facing the light source unit when the light source unit is in a first position facing toward the inner surface of the first lens unit, wherein the first lens unit is configured to transmit the light radiated by the light source unit to the inner surface of the first lens unit to outside of the vehicle body; and
an opaque material disposed inside the first lens unit between the light source unit and the inner surface of the first lens unit and configured to cover at least a first portion of the inner surface of the first lens unit so that the light source unit is hidden by the opaque material from being viewed from outside of the vehicle body through the covered first portion of the first lens unit,
wherein; the first lens unit includes a second portion of the inner surface configured to pass light from the light source unit through the first lens unit to the outside of the vehicle body when the light source unit is in the first position facing toward the inner surface of the first lens unit,
the opaque material is configured so that light radiated by the light source unit to the inner surface of the first lens unit when the light source unit is in the first position will not be radiated through the first portion of the inner surface of the first lens unit to outside of the vehicle body,
the light source unit further comprises a light rotation unit configured to rotate the light source unit between the first position radiating light toward the inner surface of the first lens unit and a second position for radiating light from the light source unit toward a second lens unit different than the first lens unit; and
the light source unit further comprises a light cover unit mounted on an outside of the light source unit and configured to rotate with the light source unit into a closed position to cover the second portion of the inner surface of the first lens unit so that light source unit is visible from the outside of the vehicle body through the second lens unit and hidden by the light cover unit from being viewed from outside the vehicle body through the first lens unit when the light source unit is rotated by the light rotation unit into the second position.

2. The lighting device of claim 1, wherein the light source unit comprises:
a plurality of vertically disposed light generation units configured to generate light when power is applied thereto;
a light connection unit combined with each of the light generation units; and
a light rotation unit configured to rotate the light connection unit such that the light generation units radiate the light to the inner surface of the first lens unit.

3. The lighting device of claim 1, wherein the second lens unit comprises a grill lens unit located in a grill at a front side of the vehicle body.

4. The lighting device of claim 1, further comprising an output unit mounted on the vehicle body and configured to provide auditory information outside the vehicle.

5. The lighting device of claim 1, further comprising an input unit provided in the vehicle body and configured to select a turn-on mode of the light source unit.

6. The lighting device of claim 1,
wherein the light source unit comprises:
a light generation unit configured to generate light when power is applied thereto;
a light connection unit combined with the light generation unit; and the light rotation unit is configured to rotate the light connection unit between the first position and the second position.

7. The lighting device of claim 2, wherein the light source unit further comprises a light cover unit mounted on an outside of each of the light generation units and configured to rotate with the light generation units into a closed position to cover the second portion of the inner surface of the first lens unit so that each of the light generation units is hidden by the light cover unit from being viewed from outside the vehicle body when each of the light generation units is rotated by the light rotation unit into the closed position.

8. The lighting device of claim 3, further comprising:
a detection unit mounted on the vehicle body and configured to detect a surrounding environment; and
a controller configured to operate the light source unit by receiving a detection signal from the detection unit,
wherein the detection unit comprises any of a movement detection unit for detecting a movement of an object, a noise detection unit for detecting noise, and a door detection unit for detecting an operation of a door.

9. The lighting device of claim 6, wherein the light cover unit is configured so that light radiated by the light generation unit will not be radiated through the portion of the inner surface of the first lens unit covered by the light cover unit to outside of the vehicle body.

10. A lighting device for a vehicle, comprising:
a center body unit mounted on a vehicle body and disposed at a central part of a front of the vehicle body;
a lens unit disposed on each of both sides of the center body unit;
a light source unit positioned in the lens unit and selectively hidden behind or configured to radiate light to the lens unit; and
a grill lens unit disposed between the center body unit and the lens unit and configured to provide grill lighting by transmitting the light radiated by the light source unit,
wherein the lens unit comprises:
a first lens unit having an outer surface thereof exposed exteriorly on the vehicle body and an inner surface thereof facing the light source unit when the light source unit is in a first position facing toward the inner surface of the first lens unit, wherein the first lens unit is configured to transmit the light radiated by the light source unit to the inner surface of the first lens unit to outside of the vehicle body; and
an opaque material disposed inside the first lens unit between the light source unit and the inner surface of the first lens unit and configured to cover at least a first portion of the inner surface of the first lens unit so that the light source unit is hidden by the opaque material from being viewed from outside of the vehicle body through the covered first portion of the first lens unit, wherein:
the first lens unit includes a second portion of the inner surface configured to pass light from the light source unit through the first lens unit to the outside of the vehicle body when the light source unit is in the first position facing toward the inner surface of the first lens unit, the opaque material is configured so that light radiated by the light source unit to the inner surface of the first lens unit when the light source unit is in the first position will not be radiated through the first portion of the inner surface of the first lens unit to outside of the vehicle body,
the light source unit further comprises a light rotation unit configured to rotate the light source unit between the first position radiating light toward the inner surface of the first lens unit and a second position for radiating light from the light source unit toward the grill lens unit; and
the light source unit further comprises a light cover unit mounted on an outside of the light source unit and configured to rotate with the light source unit into a closed position to cover the second portion of the inner surface of the first lens unit so that light source unit is visible from the outside of the vehicle body through the grill lens unit and hidden by the light cover unit from being viewed from outside the vehicle body through the first lens unit when the light source unit is rotated by the light rotation unit into the second position.

11. The lighting device of claim 10, wherein the lens unit further comprises:
a third lens unit extending backward from the first lens unit and configured to guide, to the grill lens unit, the light radiated by the light source unit.

12. The lighting device of claim 10, wherein the light source unit comprises:
a plurality of vertically disposed light generation units configured to generate light when power is applied thereto;
a light connection unit combined with each of the light generation units; and
a light rotation unit configured to rotate the light connection unit so that the light generation units radiate the light selectively to the lens unit or to the grill lens unit.

13. The lighting device of claim 10, further comprising:
a detection unit mounted on the vehicle body and configured to detect a surrounding environment; and
a controller configured to operate the light source unit in response to a detection signal from the detection unit.

14. The lighting device of claim 10, further comprising:
an output unit mounted on the vehicle body and configured to provide auditory information externally; and
an input unit provided in the vehicle body and configured to select a turn-on mode of the light source unit.

15. The lighting device of claim 12, wherein the light source unit further comprises a light cover unit mounted on an outside of each of the light generation units and configured to rotate with the light generation units into a closed position to cover the second portion of the inner surface of the first lens unit so that each of the light generation units is hidden by the light cover unit from being viewed from outside the vehicle body when each of the light generation units is rotated by the light rotation unit into the closed position.

* * * * *